United States Patent [19]

Cameron

[11] Patent Number: 5,178,495

[45] Date of Patent: * Jan. 12, 1993

[54] POLYMERIC FILM WITH BIOCIDE

[75] Inventor: William D. Cameron, Galveston, Tex.

[73] Assignee: Reef Industries, Inc., Houston, Tex.

[ * ] Notice: The portion of the term of this patent subsequent to Jan. 29, 2008 has been disclaimed.

[21] Appl. No.: 612,303

[22] Filed: Nov. 13, 1990

Related U.S. Application Data

[63] Continuation-in-part of Ser. No. 523,849, May 15, 1990, Pat. No. 4,988,236, which is a continuation of Ser. No. 221,275, Jul. 19, 1988, abandoned, which is a continuation-in-part of Ser. No. 77,592, Jul. 24, 1987, abandoned.

[51] Int. Cl.⁵ .......................... A01N 25/00; E03B 3/00
[52] U.S. Cl. ...................................... 405/303; 405/52; 424/416; 428/907
[58] Field of Search .................. 405/52, 53, 157, 303; 43/114; 424/405, 409, 414, 416, DIG. 10; 428/907

[56] References Cited

U.S. PATENT DOCUMENTS

| | | |
|---|---|---|
| 2,449,731 | 9/1948 | Therrien . |
| 2,843,068 | 7/1958 | Smith et al. . |
| 3,155,861 | 12/1963 | Allen et al. . |
| 3,262,057 | 7/1961 | Prosser . |
| 3,295,246 | 1/1967 | Landsman et al. . |
| 3,417,181 | 12/1968 | Cardarelli . |
| 3,503,800 | 3/1970 | Eddy . |
| 3,504,503 | 4/1970 | Allen et al. . |
| 3,581,703 | 6/1971 | Hosack . |
| 3,633,533 | 1/1972 | Allen et al. . |
| 3,639,583 | 2/1972 | Cardarelli et al. . |
| 3,643,450 | 2/1972 | Stansbury et al. . |
| 3,817,042 | 6/1974 | Sanderson . |
| 3,972,993 | 8/1976 | Kobayashi et al. ............. 424/416 |
| 4,171,463 | 10/1979 | Watkins . |
| 4,310,509 | 1/1982 | Berglund et al. . |
| 4,320,113 | 3/1982 | Kydonieus ...................... 424/416 |
| 4,379,655 | 4/1983 | Brost et al. . |
| 4,420,533 | 12/1988 | Preiser et al. . |
| 4,584,192 | 4/1986 | Dell et al. . |
| 4,623,282 | 11/1986 | Allen . |
| 4,654,639 | 3/1987 | DeCourville . |
| 4,683,132 | 7/1987 | Ronning et al. . |
| 4,988,236 | 1/1991 | Ramsey et al. .................. 405/157 |

FOREIGN PATENT DOCUMENTS

| | | |
|---|---|---|
| 0140797 | 5/1985 | European Pat. Off. . |
| 3329100 | 2/1985 | Fed. Rep. of Germany . |
| 2011769 | 2/1967 | France . |

OTHER PUBLICATIONS

EPX Release, May 4, 1979, Industrial Pesticide OBPA, Approved.

*Primary Examiner*—David H. Corbin
*Attorney, Agent, or Firm*—Vaden, Eickenroht, Thompson, Boulware & Feather

[57] ABSTRACT

A multi-ply film has been developed that includes a biocide in at least one of the film layers. The multi-ply film with the biocide can be used to construct water containment facilities for drinking water, fish farms and industrial use and can be used as a covering for water tanks or equipment in environments that promote microbial growth. The biocide inhibits microbial growth at the surface of the film.

27 Claims, 2 Drawing Sheets

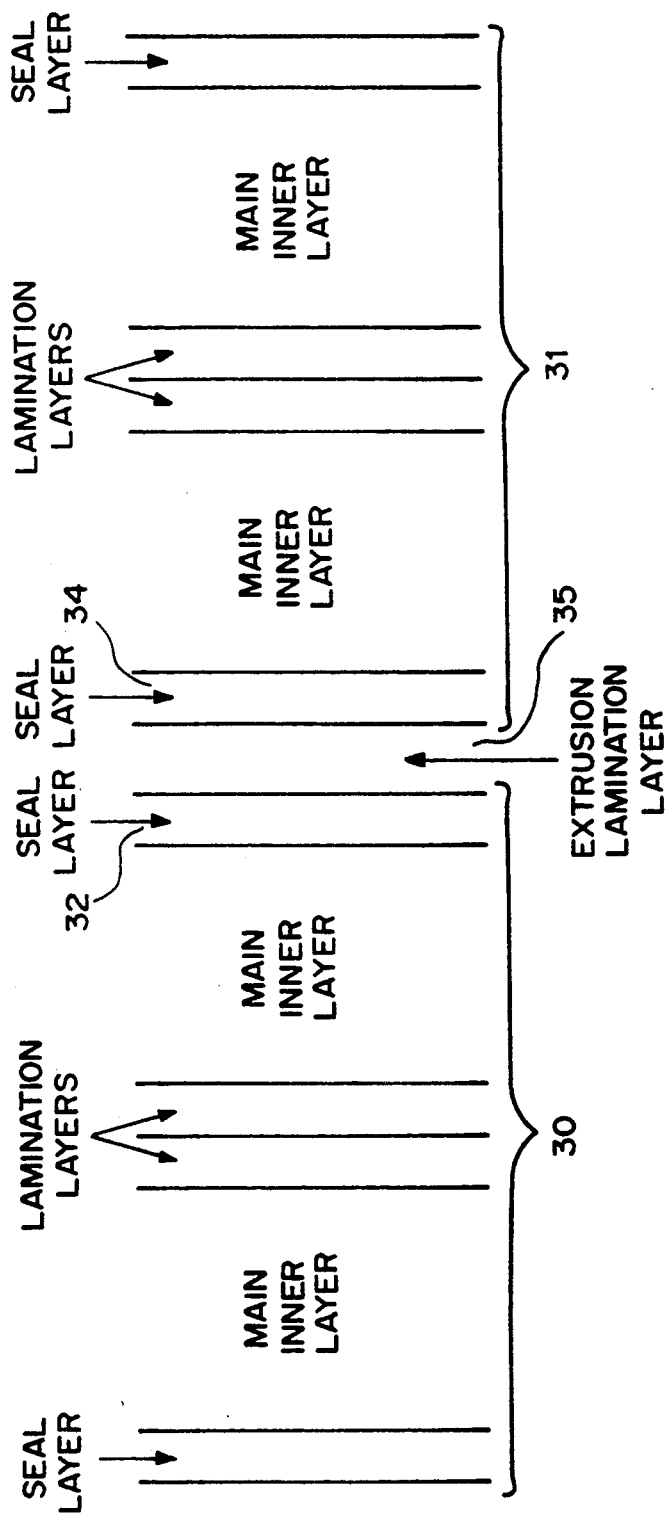

POLYMERIC FILM WITH BIOCIDE

BACKGROUND OF THE INVENTION

This application is a continuation-in-part of application Ser. No. 523,849, filed May 15, 1990, now U.S. Pat. No. 4,988,236, which was a continuation application of Ser. No. 221,275, filed Jul. 19, 1988, now abandoned, which was a continuation-in-part of Ser. No. 77,592, filed Jul. 24, 1987.

Long term water containment is necessary for fish farming and human consumption. The environment and many related concerns dictate clean, usable water. Inexpensive, potable water containment is also necessary many times for personal and industrial use. Also, a need exists for strong but flexible coverings that can be used in humid or other environments susceptible to microbial growth or tampering by pests.

Bacterial, algal, and other microbial growth is a problem for long term water containment in relatively small tanks. For instance, microbial growth can be very detrimental to a fish farmer restricted in the chemicals which he can use in raising fish for human consumption. Emptying tanks to clean them is costly and ultimately the cost is passed to the consumer.

Cisterns are used to collect rain water in areas where there is little or no ground water. People living in an area of limited fresh water such as the Virgin Islands have to deal with water collection and containment. Tanks must be cleaned on a regular basis and/or treated with chemicals to store clean water.

Plastic is often used as a liner for inexpensive long term water containment. One problem with plastic liners is the strength of the film itself. The film will often give way under the weight of the water. Fish farmers in particular have problems with puncture holes and cuts from the fish themselves. Certain films often contain adhesives which can contaminate the water and its contents. Plasticized films (PVC's) in particular may encourage the growth of bacteria and algae because certain plasticizers are considered as food sources for microorganisms.

SUMMARY OF THE INVENTION

The present invention is a polymeric multi-ply film that contains an effective amount of biocide in at least one of the layers of the film. The multi-ply film is strong enough to withstand the water weight for fish tanks or cisterns and can be made into coverings that are used outdoors or in a humid environment. The biocide is used in an effective amount in the thermoplastic to exhibit biocidal activity on and near the surface of the film. The biocidal activity discourages microbial growth including all types of microbes such as fungus, algae and bacteria. Certain additives can be used to discourage or eliminate animal tampering.

The biocide is mixed with a thermoplastic prior to extrusion. Typically the layer with the biocide is the outer layer of the multi-ply film that will be contacting water or the environment susceptible to microbial growth or pests.

Any type of thermoplastic or mixtures thereof capable of extrusion into a polymeric film can be used. The multiply film may be made of two layers of thermoplastic laminated with a non solvent based adhesive or heat laminated. The multi-ply film with biocide can be made with biocides, thermoplastic and other components approved for use by the agricultural and food governmental agencies. For instance, fish farmers can use the multi-ply film with the biocide in above-ground tanks with minimal support to raise various types of fish and related aquatic life. The multiply film can be fabricated to conform to any tank dimensions without inhibiting the performance of the biocides.

Cisterns are used in many areas of the world for fresh water and rainwater storage. The cisterns are usually located in underground or substructure locations. These locations are in normally humid environments that encourage algal growth. Installation of a multi-ply film biocide liner in the cistern will discourage the growth of algae and bacteria.

An outdoor or above ground tank is another option for residential and commercial water storage. Liners in these applications must, in addition to providing a leak proof application, be capable of expanding and contracting due to seasonal weather changes. The liner can be easily and inexpensively set up. A frame of fencing posts and wire can serve as support for the tank. The tank can be moved easily from location to location as needed.

Covers that are not susceptible to microbial growth can be made for open storage tanks fabricated from the multi-ply film. Pesticides can be added to the film to discourage animals from contaminating the water supply. The composite film can also be fabricated to enclose additional equipment such as piping and filtration systems to aid in retarding microbial growth.

BRIEF DESCRIPTION OF THE DRAWINGS

FIG. 3 is a cross-section of an alternative embodiment of two laminates that are joined with an additional extrusion layer.

DETAILED DESCRIPTION OF THE INVENTION

Figure 1:
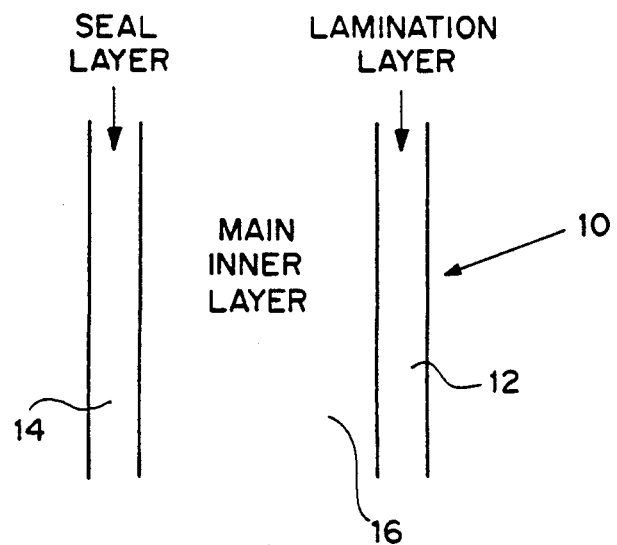
FIG. 1 is a cross-section of a three layer co-extruded sheet.

The multi-ply film of this invention has at least two layers of thermoplastic. At least one of the layers includes a biocide. Some of the embodiments described below are co-extruded thermoplastic sheets with one or more layers comprising the single sheet. The biocide is mixed with at least one of the layers prior to extrusion. It is not the intent to limit the thermoplastic that can be used to practice the invention. A listing of some of the polymers includes various types of polyethylene including high density, low density, linear low density and high molecular weight high density, ultra high molecular weight polyethylenes, polypropylene, ethylene vinyl acetate, ethylene acrylic acid, nylon, ionomer (polyethylene with metal ions to form a polar molecule) and mixtures thereof.

Choice of a polymer, whether a polar or non-polar properties are preferred, depends in part, on the compatibility with the chosen biocide. The biocide can be chosen from the herbicide, fungicide, bactericide or pesticide categories or mixtures of selected biocides. The biocides selected are mixed with the polymers prior to extrusion. The amount of biocides mixed with the polymers depends on the potency and the leaching characteristics and leaching desirability of the end product. In the multi-ply polymeric film of the invention, the biocide can be mixed with more than one of the layers prior to extrusion. Typically the layer on the surface of the film will contain the biocide. In the alternative, inner layers of the film may contain the biocide which will travel from the inner layers to the surface of the film over time. The biocidal effect will be longer lasting.

For most biocides, no more than eight percent by weight to the thermoplastic would be used and generally a lower amount is needed for effectiveness. The amount of biocide would depend on its potency and the environment in which the multi-ply polymeric film will be used. A higher amount of biocide can be used depending on environmental conditions. The biocides that can be used are the available arsenic compounds, organophosphorus compounds, heavy metal compounds, sulfur compounds, tin compounds and other categories of biocides. The polymers in the film are selected to be compatible with the biocides chosen.

Some biocides are available in a polymeric carrier. One example is Vinyzene ®, SB-1 PR, a concentrate of 10, 10'-oxybisphenoxarsine supplied in a polyolefin pelletized resin carrier form. The pelletized form can be mixed and extruded with other polymers. The biocide is five percent to ninety-five percent of the carrier as selected. The biocide of choice with or without the carrier should be compatible with the polymeric layer of the film.

Some examples of biocide used in films are Zinc Omadine manufactured by Olin Chemical, Zinc Tryithione; and Intercide TMEP by Akzochemie America, N-trichloromethylthiophthalimide. These compounds are exemplary of the biocides which can be used in this invention. Other biocides may be used.

A reinforcing yarn in a woven or non-woven arrangement may be used with the multi-ply polymeric film as reinforcement between the sheets of thermoplastic. The reinforcing yarn can be made of polyester, nylon and monofilament as desired.

Additional reinforcing is achieved by laminating two layers of film in a non-linear manner or arrangement. The layers of film are extruded in a linear orientation as the film exits the extrusion machine. If two separate sheets are laminated together such that the original machine orientations of each of the sheets differ from each other in a non-linear manner, the resultant laminant is much stronger. A lamination layer of a heat lamination thermoplastic is the desired method of lamination. A detailed description of one process of achieving a high-strength laminate comprising generally weakly adhered biaxially oriented films is shown in U.S. Pat. No. 4,039,364 by Rasmussen issued Aug. 2, 1977, which patent is incorporated by reference herein in its entirety. The following are exemplary of the types of embodiments of this invention but are not intended to limit the variety of embodiments covered by the scope of the invention.

EXAMPLE 1

Two sheets of co-extruded thermoplastic with three co-extruded layers that form the single sheets of thermoplastic are prepared. FIG. 1 illustrates a cross-section of the three co-extruded layers in one of the thermoplastic sheets 10. The main inner layer 16 is comprised of a polymer or mixture of polymers previously described. In the preferred embodiment the main inner layer 16 is seventy percent by weight of the thermoplastic sheet and is made of a mixture of high density polyethylene and linear low density polyethylene. The main layer may also include a pigment to color the final product and ultraviolet stabilizers or antioxidants. The main inner layer may also include an effective amount of biocide.

The thermoplastic sheet has a seal layer 14 which is an outside layer of the finished polymeric multi-ply film. The thermoplastic used to prepare the seal layer is mixed with the biocide prior to co-extrusion. In the preferred embodiment, the seal layer is about fifteen percent by weight of the thermoplastic sheet and is made of linear low density polyethylene mixed with the biocide. In the preferred embodiment Vinyzene ® SB-1 PR is used. The biocide is about 0.05 percent weight of the co-extruded sheet. The seal layer may be greater or lesser than 15 percent by weight of the co-extruded sheet. If the seal layer is less, the biocide will be loaded to a greater degree prior to extrusion. Other thermoplastics may be used in the seal layer. Also, the seal layer preferably contains ultraviolet stabilizers and antioxidants.

A lamination layer 12 is opposite the seal layer 14 and contiguous to main inner layer 16. In the preferred embodiment, the lamination layer is 15 percent by weight of the thermoplastic sheet. The lamination layer is composed of a thermoplastic or mixtures thereof that are capable of heat lamination. In the preferred embodiment, the lamination layer is made up of at least 50 percent by weight of ethylene propylene diene rubber or very low density polyethylene or mixtures thereof with the balance of linear low density polyethylene. Ethylene, ethylene-methyl acrylate and ionomers may be used in the lamination layer. The lamination layer can be reduced to the minimum amount of polymer necessary to provide a heat lamination capability.

A second thermoplastic sheet, as shown in FIG. 1 and described above, is co-extruded. In a preferred embodiment, the co-extruded film is prepared according to the Rasmussen patent referenced above. To summarize, the co-extruded thermoplastic is prepared as a blown film and is co-extruded in a continuous tubular shape. The linear orientation of the polymer referred to herein means the linear direction from which the blown film exits the co-extrusion machine. The tubular film is spiral cut by slitting on a 45° angle to the original machine orientation. Two layers of the spiral cut film are then laminated to form a multi-ply film 20 as shown in cross-section in FIG. 2. The two sheets of film are laminated face to face with the orientation in nonlinear to the original machine orientation. In the preferred embodiment, the layers are joined in a 90° angle orientation to one another by a heat lamination process. In the preferred embodiment, as the laminator joins the films, it prestresses and orients the thermoplastic sheets in both transverse and machine directions. The result is a multiaxially oriented multi-ply polymeric film which has balanced physical properties in both machine and transverse directions.

Figure 2:
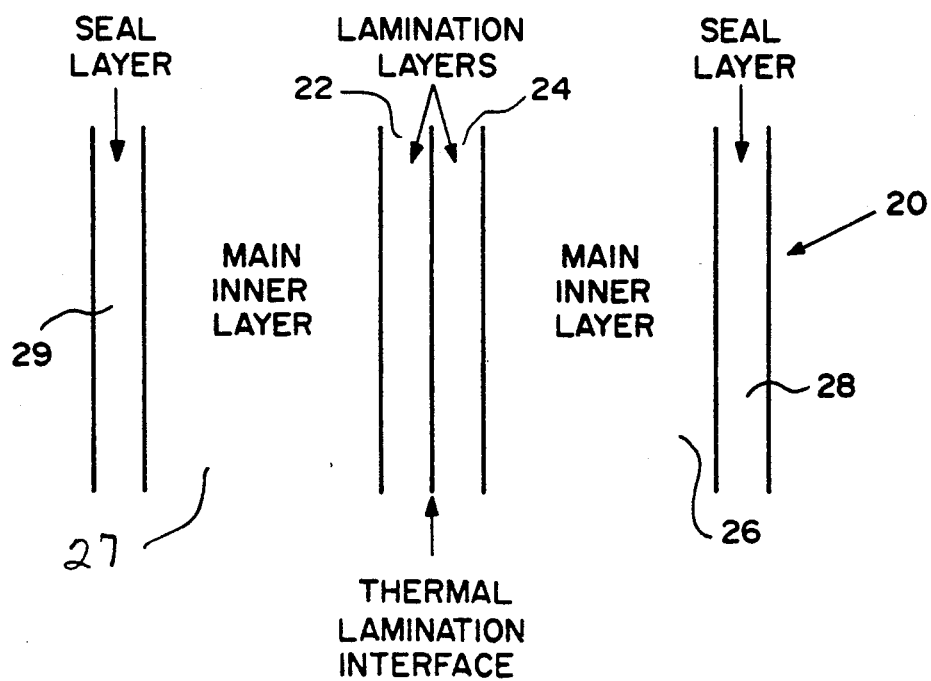
FIG. 2 is a cross-section of a laminated multi-ply film of two sheets of three layer co-extruded thermoplastic.

As shown in FIG. 2, lamination layers 22 and 24 are in the center of the multi-ply film after the heat laminated process. The main inner layers 26 and 27 are covered on the outside by seal layers 28 and 29. One or both of the seal layers may contain biocide depending on the desired properties of the finished multi-ply product. In some applications, only one side of the film would need to include biocide in which case one of the thermoplastic sheets would be prepared without adding the biocide prior to the co-extrusion process. The final thickness of the multiply film in the preferred embodiments is up to 20 mils thick. The thickness of the film can be adjusted according to the desired application.

EXAMPLE 2

In some instances, the film with more sheets than Example 1 may be desired to compose the multi-ply film. FIG. 3 shows a cross-section of a multi-ply film which is composed of two multi-ply films 30 and 31 (shown separately in FIG. 2) that have been prepared as described in Example 1. The two multi-ply films 30 and 31 are joined with seal layers 32 and 34 facing each other with an additional extrusion lamination layer 35 in between. In the alternative embodiment, an extrusion coating grade of low density polyethylene is used bond the sheets 30 and 31 together with hot resin introduced between sheets 30 and 3 as they are rolled together.

EXAMPLE 3

Another embodiment of the multi-ply film utilizes a two layer co-extruded thermoplastic sheet composed of a lamination layer and a main layer. The lamination layer contains a thermoplastic capable of heat lamination. The main layer is of a thermoplastic or mixture of thermoplastics including a biocide. The two layer thermoplastic is preferably manufactured in a similar manner as described in Example 1, such that at least two sheets may be heat laminated together oriented in a non-linear manner. At least one of the main layers contains an effective amount of biocide that is mixed with the thermoplastic prior to the co-extrusion process. The end product is like FIG. 2, except seal layers 29 and 28 are omitted, and the biocide is in at least one of the layers 26 and 27.

EXAMPLE 4

An alternative embodiment is composed of at least two sheets of thermoplastic prepared as described in Example 1 and shown in FIG. 1. These thermoplastic sheets each having a seal, main and lamination layer are the outer sheets of the multi-ply film with the seal layers facing outward. In the center of the multi-ply film is at least one co-extruded thermoplastic sheet composed of a main inner layer with two lamination layers as described in Example 1 on either side of the main layer. The multiple thermoplastic sheets are heat laminated as described above with the layers oriented in a non-linear arrangement with respect to each contiguous sheet. Multiple sheets of co-extruded thermoplastic with a main layer and lamination layers on either side may be introduced in between the co-extruded sheets with seal layers. A biocide may be included in any of the main layers and at least one of the seal layers.

As can be seen by the four examples above, there are a variety of multi-ply films that may be made according to the present invention. It is not intended that these examples limit the configuration or composition of the multi-ply films of this invention.

What I claim is:

1. A polymeric multi-ply film comprising
   at least two layers of thermoplastic forming a multi-ply film;
   at least one of said layers including a biocide in a sufficient amount for biocidal activity;
   said biocide mixed with the thermoplastic prior to extrusion of the sheet; and
   said biocide effectively retarding microbial growth at the surface of the layer of the sheet containing the biocide.

2. A polymeric multi-ply film of claim 1 wherein said biocide is selected from the group consisting of arsenic compounds, organophosphorus compounds, heavy metal compounds, sulfur compounds, tin compounds and mixtures thereof.

3. A polymeric multi-ply film of claim 1 wherein a reinforcing yarn is in between two layers of thermoplastic.

4. A polymeric multi-ply film of claim 1 wherein a non-solvent based adhesive is used to form the multi-ply film.

5. A polymeric multi-ply film of claim 1 wherein said thermoplastic is selected from the group consisting essentially of polypropylene, high density polyethylene, low density polyethylene, linear low density polyethylene, high molecular weight, ultra high molecular weight polyethylene, ethylene acrylic acid, ethylene vinyl acetate, nylon, ionomers and mixtures thereof.

6. A polymeric multi-ply film of claim 1 where in the layers of film are not linearly oriented to each other.

7. A polymeric multi-ply film comprising
   a co-extruded thermoplastic with three co-extruded layers that form a single sheet of thermoplastic;
   a main inner layer of said co-extruded thermoplastic sheet;
   a lamination layer of a polymer or mixtures of polymers capable of heat lamination contiguous to said main inner layer;
   a seal layer contiguous to said inner layer and opposite to said lamination layer;
   two sheets of said co-extruded thermoplastic with the seal layer of at least one sheet mixed with biocide prior to co-extrusion of said sheet of thermoplastic and said sheets heat laminated with the lamination layers facing each other and said sheets oriented in a nonlinear manner; and
   said biocide effectively retarding microbial growth at the surface of the seal layer containing the biocide.

8. A polymeric multi-ply film of claim 7 wherein said inner layer of said co-extruded thermoplastic sheet is selected from the group consisting essentially of high density polyethylene, low density polyethylene, linear low density polyethylene, high molecular weight high density polyethylene, ultra high molecular weight polyethylene, polypropylene, ethylene vinyl acetate, ethylene acrylic acid, nylon, ionomers and mixtures thereof.

9. A polymeric multi-ply film of claim 7 wherein said lamination layer of said co-extruded film is selected from the group of heat lamination thermoplastics consisting essentially of ethylene propylene diene rubber, very low density polyethylene, ethylene, ethylene-methyl acrylate, ionomers and mixtures thereof.

10. A polymeric multi-ply film of claim 7 wherein said seal layer thermoplastic is selected from the group consisting essentially of high density polyethylene, low density polyethylene, linear low density polyethylene, polypropylene, ethylene vinyl acetate, ethylene acrylic acid, ionomers and mixtures thereof.

11. A polymeric multi-ply film of claim 7 wherein said biocide is selected from the group consisting of arsenic compounds, organophosphorus compounds, heavy metal compounds, sulfur compounds, tin compounds and mixtures thereof.

12. A polymeric multi-ply film of claim 7 wherein said main inner layer includes a biocide in a sufficient amount for effective biocidal activity.

13. A polymeric multi-ply film comprising two sheets of co-extruded thermoplastic each with two co-extruded layers that form a single sheet of thermoplastic;

a lamination layer forming one of the layers of said co-extruded thermoplastic sheet that is capable of heat lamination;

a main layer opposite said lamination layer of a thermoplastic mixed with said biocide prior to co-extrusion of said sheet of thermoplastic;

said two sheets of co-extruded thermoplastic heat laminated with the lamination layers facing each other with said sheets oriented in a nonlinear manner; and said biocide effectively retarding microbial growth at the surface of the layers containing the biocide.

14. A polymeric multi-ply film of claim 12 wherein said lamination layer is selected from the group consisting of heat lamination thermoplastics consisting essentially of ethylene propylene diene rubber, very low density polyethylene, ethylene, ethylene-methyl acrylate, ionomers and mixtures thereof.

15. A polymeric multi-ply film of claim 13 wherein said main layer is selected from the group consisting essentially of high density polyethylene, low density polyethylene, linear low density polyethylene, high molecular weight high density polyethylene, ultra high molecular weight polyethylene, polypropylene, ethylene vinyl acetate, ethylene acrylic acid, nylon, ionomers and mixtures thereof and said biocide is selected from the group consisting of arsenic compounds, organophosphorus compounds, heavy metal compounds, sulfur compounds, tin compounds and mixtures thereof.

16. A polymeric multi-ply film comprising two sheets of co-extruded thermoplastic with three co-extruded layers that form a single sheet of thermoplastic;

main inner layer of said co-extruded thermoplastic;

a lamination layer of a polymer or mixtures of polymers capable of heat lamination contiguous to said main inner layer;

a seal layer opposite said lamination layer and contiguous to said main inner layer of a thermoplastic;

an additional sheet of co-extruded thermoplastic with three co-extruded layers of an inner layer and two lamination layers capable of heat lamination on either side of the inner layer;

said additional sheet of co-extruded thermoplastic heat laminated to the two co-extruded thermoplastic sheets having the seal layer such that the seal layers face outward and the sheet with two lamination layers is sandwiched in between;

said sheets oriented one to another in a nonlinear arrangement with respect to each contiguous sheet;

at least one of said seal layers mixed with a biocide prior to co-extrusion of said sheet of thermoplastic; and said biocide effectively retarding microbial growth at the surface of the seal layers containing the biocide.

17. A polymeric multi-ply film of claim 15 wherein said thermoplastic sheets include a biocide in a sufficient amount for effective biocidal activity.

18. A polymeric multi-ply film of claim 16 with more than one additional sheet of co-extruded thermoplastic with lamination layers on either side of an inner layer that is heat laminated sandwiched in between other sheets with said sheets with seal layers as outer layers of the multi-ply film with each sheet oriented in a nonlinear arrangement with respect to the contiguous sheet to which it is laminated.

19. A polymeric multi-ply film of claim 16 wherein layers other than lamination layers include a biocide in a sufficient amount for effective biocidal activity.

20. A polymeric multi-ply film of claim 16 wherein the layers that are not lamination layers are selected from the group consisting essentially of high density polyethylene, low density polyethylene, linear low density polyethylene, high molecular weight high density polyethylene, ultra high molecular weight polyethylene, polypropylene, ethylene vinyl acetate, ethylene acrylic acid, nylon, ionomers and mixtures thereof 21. A polymeric multi-ply film of claim 15 wherein said lamination layer is selected from the group consisting of heat lamination thermoplastics consisting essentially of ethylene propylene diene rubber, very low density polyethylene, ethylene, ethylene-methyl acrylate, ionomers and mixtures thereof.

22. A polymeric multi-ply film of claim 16 wherein said biocide is selected from the group consisting of arsenic compounds, organophosphorus compounds, heavy metal compounds, sulfur compounds, tin compounds and mixtures thereof.

23. A polymeric multi-ply film comprising two sheets of co-extruded thermoplastic with three co-extruded layers that form a single sheet of thermoplastic;.

a main inner layer of said co-extruded thermoplastic;

a lamination layer of a polymer or mixture thereof capable of heat lamination contiguous to said main inner layer;

a seal layer opposite said lamination layer and contiguous to said main inner layer of a thermoplastic;

said two sheets of co-extruded thermoplastic heat laminated with the lamination layers facing each other and said sheets oriented in a nonlinear manner to form a reinforced laminate;

at least two reinforced laminate layers further laminated together with an extrusion coating to form a multi-ply film;

a biocide mixed with the thermoplastic prior to extrusion in at least one of the seal layers; and said biocide in a effective amount to retard microbial growth at the surface of the film.

24. A polymeric multi-ply film of claim 23 wherein said thermoplastic sheets include a biocide in a sufficient amount for effective biocidal activity in layers other than the lamination layers.

25. A polymeric multi-ply film of claim 23 wherein said biocide is selected from the group consisting of arsenic compounds, organophosphorus compounds, heavy metal compounds, sulfur compounds, tin compounds and mixtures thereof.

26. A polymeric multi-ply film of claim 23 wherein said lamination layers are selected from the group of heat lamination thermoplastics consisting essentially of ethylene propylene diene rubber, very low density polyethylene, ethylene, ethylene-methyl acrylate, ionomers and mixtures thereof.

27. A polymeric multi-ply film of claim 23 wherein said main and seal layers are selected from the group essentially consisting of high density polyethylene, low density polyethylene, linear low density polyethylene, high molecular weight high density polyethylene, ultra high molecular weight polyethylene, polypropylene, ethylene vinyl acetate, ethylene acrylic acid, nylon, ionomer and mixtures thereof.

* * * * *